US009800510B2

(12) United States Patent
Liu et al.

(10) Patent No.: US 9,800,510 B2
(45) Date of Patent: Oct. 24, 2017

(54) METHOD AND DEVICE FOR DOWNLOADING FILE

(71) Applicant: Xiaomi Inc., Beijing (CN)

(72) Inventors: Fang Liu, Beijing (CN); Weixian Yang, Beijing (CN)

(73) Assignee: Xiaomi Inc., Beijing (CN)

(*) Notice: Subject to any disclaimer, the term of this patent is extended or adjusted under 35 U.S.C. 154(b) by 197 days.

(21) Appl. No.: 14/923,990

(22) Filed: Oct. 27, 2015

(65) Prior Publication Data

US 2016/0050155 A1 Feb. 18, 2016

Related U.S. Application Data

(63) Continuation of application No. PCT/CN2013/091075, filed on Dec. 31, 2013.

(30) Foreign Application Priority Data

Apr. 28, 2013 (CN) .......................... 2013 1 0156883

(51) Int. Cl.
*H04L 12/26* (2006.01)
*H04L 12/841* (2013.01)
(Continued)

(52) U.S. Cl.
CPC ............ *H04L 47/286* (2013.01); *H04L 47/36* (2013.01); *H04L 67/04* (2013.01); *H04L 67/06* (2013.01);
(Continued)

(58) Field of Classification Search
CPC ....... H04L 47/286; H04L 47/36; H04L 67/04; H04L 67/06; H04L 67/2871; H04L 67/108; H04L 76/023
See application file for complete search history.

(56) References Cited

U.S. PATENT DOCUMENTS 9,325,476 B2 * 4/2016 Li
9,485,108 B2 * 11/2016 Pazos .................. H04L 12/1881
(Continued)

FOREIGN PATENT DOCUMENTS

CN 1578222 A 2/2005
CN 1928857 A 3/2007
(Continued)

OTHER PUBLICATIONS

English version of International Search Report of PCT/CN2013/091075, from the State Intellectual Property Office of China, dated Apr. 3, 2014.
(Continued)

*Primary Examiner* — Shaq Taha
(74) *Attorney, Agent, or Firm* — Finnegan, Henderson, Farabow, Garrett & Dunner LLP

(57) ABSTRACT

A method for downloading a file for use in a first mobile terminal, includes: determining at least one second mobile terminal, connected with the first mobile terminal, as a receiving mobile terminal; sending a request for splitting and downloading a file for a server to split the file into a plurality of subfiles and send at least one of the plurality of subfiles to the receiving mobile terminal; after the receiving mobile terminal completes receiving of the subfile, acquiring the subfile from the receiving mobile terminal; and after all of the plurality of subfiles are acquired, combining the plurality of subfiles into the file and saving the file.

18 Claims, 16 Drawing Sheets

(51) Int. Cl.
*H04W 76/02* (2009.01)
*H04L 12/805* (2013.01)
*H04L 29/08* (2006.01)

(52) U.S. Cl.
CPC ....... *H04L 67/2871* (2013.01); *H04W 76/023* (2013.01); *H04L 67/108* (2013.01)

(56) References Cited

U.S. PATENT DOCUMENTS

| | | | |
|---|---|---|---|
| 9,485,299 B2* | 11/2016 | Myers | H04L 65/608 |
| 2002/0059400 A1 | 5/2002 | Ikami et al. | |
| 2006/0234684 A1 | 10/2006 | Shin | |
| 2010/0191756 A1 | 7/2010 | Terao | |
| 2014/0204807 A1* | 7/2014 | Li | H04B 1/50 |
| | | | 370/277 |
| 2014/0229582 A1* | 8/2014 | Liu | H04L 67/06 |
| | | | 709/219 |

FOREIGN PATENT DOCUMENTS

| | | |
|---|---|---|
| CN | 102624858 A | 8/2012 |
| CN | 102684989 A | 9/2012 |
| CN | 103237300 A | 8/2013 |
| EP | 1 752 886 | 2/2007 |
| JP | 2002132613 A | 5/2002 |
| JP | 2004213508 A | 7/2004 |
| JP | 2009009297 A | 1/2009 |
| KR | 1020050011977 | 4/2006 |
| KR | 100610844 B1 | 8/2006 |
| RU | 2008141304 A | 4/2010 |
| RU | 2415514 C2 | 3/2011 |
| WO | WO 2008120366 A1 | 10/2008 |
| WO | WO 2012/035665 A1 | 3/2012 |

OTHER PUBLICATIONS

Extended European Search Report for Application No. 13883671.3, from the European Patent Office, dated Nov. 7, 2016.

* cited by examiner

METHOD AND DEVICE FOR DOWNLOADING FILE

CROSS-REFERENCE TO RELATED APPLICATIONS

This application is a continuation of International Publication No. PCT/CN2013/091075, filed Dec. 31, 2013, which is based upon and claims priority to Chinese Patent Application No. 201310156883.0, filed Apr. 28, 2013, the entire contents of all of which are incorporated herein by reference.

TECHNICAL FIELD

The present disclosure relates to a mobile terminal technology and, more particularly, to a method and a device for downloading a file.

BACKGROUND

A mobile terminal can be used to download files including games, applications, videos and the like. However, when a file to be downloaded has a relatively large size, it may take the mobile terminal a relatively long time to download the file if, e.g., a bandwidth for the mobile terminal to download the file is limited.

SUMMARY

According to a first aspect of the present disclosure, there is provided a method for downloading a file for use in a first mobile terminal, comprising: determining at least one second mobile terminal, connected with the first mobile terminal, as a receiving mobile terminal; sending a request for splitting and downloading a file for a server to split the file into a plurality of subfiles and send at least one of the plurality of subfiles to the receiving mobile terminal; after the receiving mobile terminal completes receiving of the subfile, acquiring the subfile from the receiving mobile terminal; and after all of the plurality of subfiles are acquired, combining the plurality of subfiles into the file and saving the file.

According to a second aspect of the present disclosure, there is provided a method for a server to provide a file to be downloaded, comprising: receiving a request for splitting and downloading a file, sent by a first mobile terminal, after the first mobile terminal determines at least one second mobile terminal connected with the first mobile terminal as a receiving mobile terminal; and splitting the file into a plurality of subfiles and sending at least one of the plurality of subfiles to the receiving mobile terminal, wherein after the receiving mobile terminal completes receiving of the subfile, the first mobile terminal acquires the sub-file from the receiving mobile terminal, and after all of the plurality of subfiles are acquired, the first mobile terminal combines the subfiles into the file and saves the file.

According to a third aspect of the present disclosure, there is provided a method for downloading a file for use in a second mobile terminal, comprising: determining that a first mobile terminal connected with the second mobile terminal needs to download a file; receiving a subfile sent by a server, after the server receives from the first mobile terminal a request for splitting and downloading the file and splits the file into a plurality of subfiles; and after completing the receiving of the subfile, sending the received subfile to the first mobile terminal, such that the first mobile terminal, after acquiring all of the plurality of subfiles, combines the plurality of subfiles into the file and saves the file.

According to a fourth aspect of the present disclosure, there is provided a first mobile terminal for downloading a file, comprising: a processor; and a memory for storing instructions executable by the processor; wherein the processor is configured to: determine at least one second mobile terminal, connected with the first mobile terminal, as a receiving mobile terminal; send a request for splitting and downloading a file for a server to split the file into a plurality of sub-files and send at least one of the plurality of subfiles to the receiving mobile terminal; after the receiving mobile terminal completes receiving of the subfile, acquire the subfile from the receiving mobile terminal; and after all of the plurality of subfiles are acquired, combine the plurality of subfiles into the file and save the file.

According to a fifth aspect of the present disclosure, there is provided a server for providing a file to be downloaded, comprising: a processor; and a memory for storing instructions executable by the processor; wherein the processor is configured to: receive a request for splitting and downloading a file, sent by a first mobile terminal, after the first mobile terminal determines at least one second mobile terminal connected with the first mobile terminal as a receiving mobile terminal; and split the file into a plurality of subfiles and send at least one of the plurality of subfiles to the receiving mobile terminal, wherein after the receiving mobile terminal completes receiving of the subfile, the first mobile terminal acquires the subfile from the receiving mobile terminal, and after all of the plurality of subfiles are acquired, the first mobile terminal combines the subfiles into the file and saves the file.

According to a sixth aspect of the present disclosure, there is provided a second mobile terminal, comprising: a processor; and a memory for storing instructions executable by the processor; wherein the processor is configured to: determine that a first mobile terminal connected with the second mobile terminal needs to download a file; receive a subfile sent by a server, after the server receives from the first mobile terminal a request for splitting and downloading the file and splits the file into a plurality of subfiles; and after completing the receiving of the subfile, send the received sub-file to the first mobile terminal, such that the first mobile terminal, after acquiring all of the plurality of subfiles, combines the plurality of subfiles into the file and saves the file:

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with some aspects related to the disclosure as recited in the appended claims.

Figure 1:
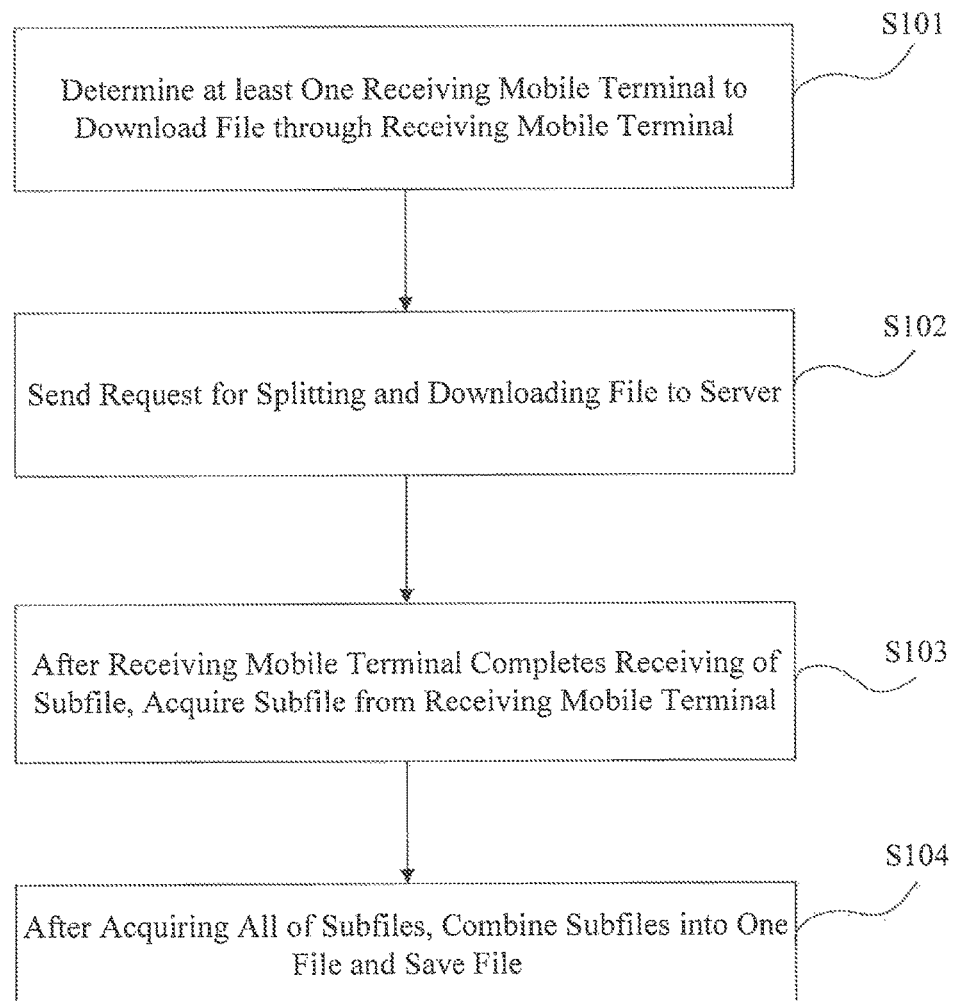
FIG. 1 is a flow chart of a method for downloading a file, according to an exemplary embodiment.

FIG. 1 is a flowchart of a method 100 for downloading a file, according to an exemplary embodiment. For example, the method 100 is used in a first mobile terminal to download a file. Referring to FIG. 1, the method 100 includes the following steps.

In step S101, the first mobile terminal determines at least one second mobile terminal connected with the first mobile terminal as a receiving mobile terminal for receiving the file, to download the file through the receiving mobile terminal.

In step S102, the first mobile terminal sends a request for splitting and downloading the file to a server, so that the server splits the file to a plurality of subfiles and sends at least one of the subfiles to the receiving mobile terminal. In one exemplary embodiment, the server sends remaining one(s) of the subfiles to other determined receiving mobile terminal(s). In another embodiment, the server sends remaining one(s) of the subfiles to the other determined receiving mobile terminal(s) as well as the first mobile terminal.

In step S103, after the receiving mobile terminal completes receiving the subfile from the server, the first mobile terminal acquires the subfile from the receiving mobile terminal.

In step S104, the first mobile terminal acquires the remaining one(s) of the subfiles and after acquiring all of the subfiles, the first mobile terminal combines the subfiles into one file and saves the file.

In exemplary embodiments, the receiving mobile terminal is connected with the first mobile terminal through a wired or wireless connection, thus realizing resource sharing among mobile terminals. For example, the wireless connection may be a wireless connection for sharing resources among devices, such as a Bluetooth connection or an ad hoc WiFi connection.

In the exemplary embodiment, when the first mobile terminal needs to download a file, if there are one or more second mobile terminals connected with the first mobile terminal, the file may be downloaded through the one or more second mobile terminals connected with the first mobile terminal. The first mobile terminal may determine at least one of the one or more second mobile terminals as receiving mobile terminals.

After the first mobile terminal sends the request for splitting and downloading the file to the server, the server splits the file into the plurality of subfiles and sends at least one subfile to the receiving mobile terminal. For example, when a bandwidth available for the first mobile terminal is narrow, in order to increase a download speed, the first mobile terminal may download the file through the receiving mobile terminal.

After the receiving mobile terminal completes receiving of the subfile, the first mobile terminal can acquire from the receiving mobile terminal the subfile received by the receiving mobile terminal, and combine the acquired subfile with the remaining subfile(s) directly received from the server into one file and save the file, thereby downloading the file within a relatively short time.

Figure 2:
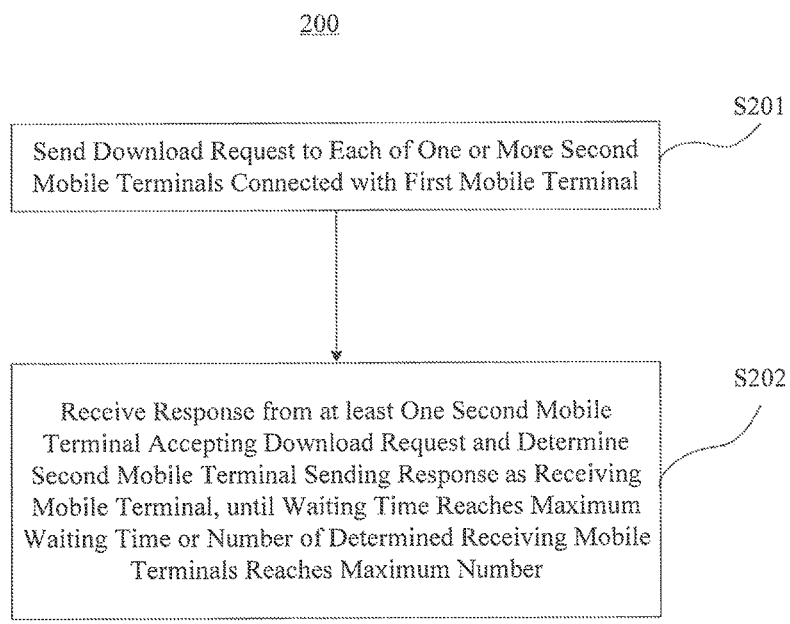
FIG. 2 is a flow chart of a method for determining a mobile terminal for receiving a file, according to an exemplary embodiment.

FIG. 2 is a flowchart of a method 200 for determining a receiving mobile terminal, according to an exemplary embodiment. For example, the mobile terminal performs the method 200 to perform step S101 (FIG. 1). Referring to FIG. 2, the method 200 includes the following steps.

In step S201, the first mobile terminal sends a download request to each of one or more second mobile terminals connected with the first mobile terminal.

In step S202, the first mobile terminal receives a response from at least one of the one or more second mobile terminals accepting the download request, and determines the second mobile terminal sending the response as a receiving mobile terminal, until a waiting time reaches a maximum waiting time set according to a size of the file to be downloaded, or a number of the determined receiving mobile terminals reaches a maximum number set according to the size of the file to be downloaded.

In exemplary embodiments, different mobile terminals may have different performances and bandwidths, a download speed of a mobile terminal having a better performance is generally faster than that of a mobile terminal having a poorer performance, and a download speed of a mobile terminal having a relatively wide bandwidth is generally faster than that of a mobile terminal having a relatively narrow bandwidth. Therefore, when splitting the file to be downloaded and distributing a download task, the device performance and the bandwidth of each receiving mobile terminal can be considered. In practical applications, the request for splitting and downloading the file may include a proportional relation of sizes of the subfiles after the splitting, which is determined according to the size of the file to be downloaded as well as the device performance and the bandwidth of each receiving mobile terminal, and a download mapping relation between the subfiles and the receiving mobile terminal(s), which is also determined according to the size of the file to be downloaded as well as the device performance and the bandwidth of each receiving mobile terminal.

In exemplary embodiments, the server, after receiving the request for splitting and downloading the file, splits the file to be downloaded into a plurality of subfiles according to the proportional relation of the sizes of the subfiles, and sends each subfile to a corresponding receiving mobile terminal according to the download mapping relation, a number of the subfiles being the same as a number of the receiving mobile terminals.

For example, the first mobile terminal determines, e.g., three receiving mobile terminals in step S101 (FIG. 1). Among the three receiving mobile terminals, one receiving mobile terminal has a better performance and a wider bandwidth than the other two receiving mobile terminals. Accordingly, the file to be downloaded may be split into a larger subfile and two smaller subfiles, with the larger subfile sent to the receiving mobile terminal having a better performance and a wider bandwidth, and the two smaller subfiles sent to the other two receiving mobile terminals, respectively.

In exemplary embodiments, if the file to be downloaded is a video file and the subfiles after the splitting are video segments, the file may be split according to a time length of the video file and the proportional relation of the sizes of the subfiles. For example, the server may determine a starting time point and an ending time point corresponding to each video segment according to the proportional relation of the sizes of the subfiles, and further determine a time stamp of a video frame and/or an audio frame corresponding to each of the starting time point and the ending time point of each video segment in the video file. The server may then acquire a displacement position of the video frame and/or the audio frame corresponding to each of the starting time point and the ending time point of each video segment in the video file, according to a corresponding relationship between the time stamp and the displacement position, and acquire data of each video segment according to the displacement position of the video frame and/or the audio frame corresponding to each of the starting time point and the ending time point of each video segment in the video file, thus obtaining each video segment.

In exemplary embodiments, to facilitate the download progress and improve the download smoothness, after sending the request for splitting and downloading the file, the first mobile terminal further checks a download status of each receiving mobile terminal. When determining that a download speed of a receiving mobile terminal is slower than a predetermined threshold or determining that a connection between a receiving mobile terminal and the first mobile terminal is poor, the first mobile terminal sends an instruction for terminating download to the receiving mobile terminal, and the subfile corresponding to this receiving mobile terminal is determined as a new file to be downloaded.

In practical applications, a download time may be set for each receiving mobile terminal. When reaching the download time, the first mobile terminal sends a download progress inquiring request to each receiving mobile terminal. If the first mobile terminal receives a response indicating a download speed slower than the predetermined threshold or does not receive a response from a receiving mobile terminal within a set time, the first mobile terminal determines that the download speed of this receiving mobile terminal is too slow, and sends an instruction for terminating download to this receiving mobile terminal. The subfile corresponding to this receiving mobile terminal is determined as a new file to be downloaded.

Figure 3:
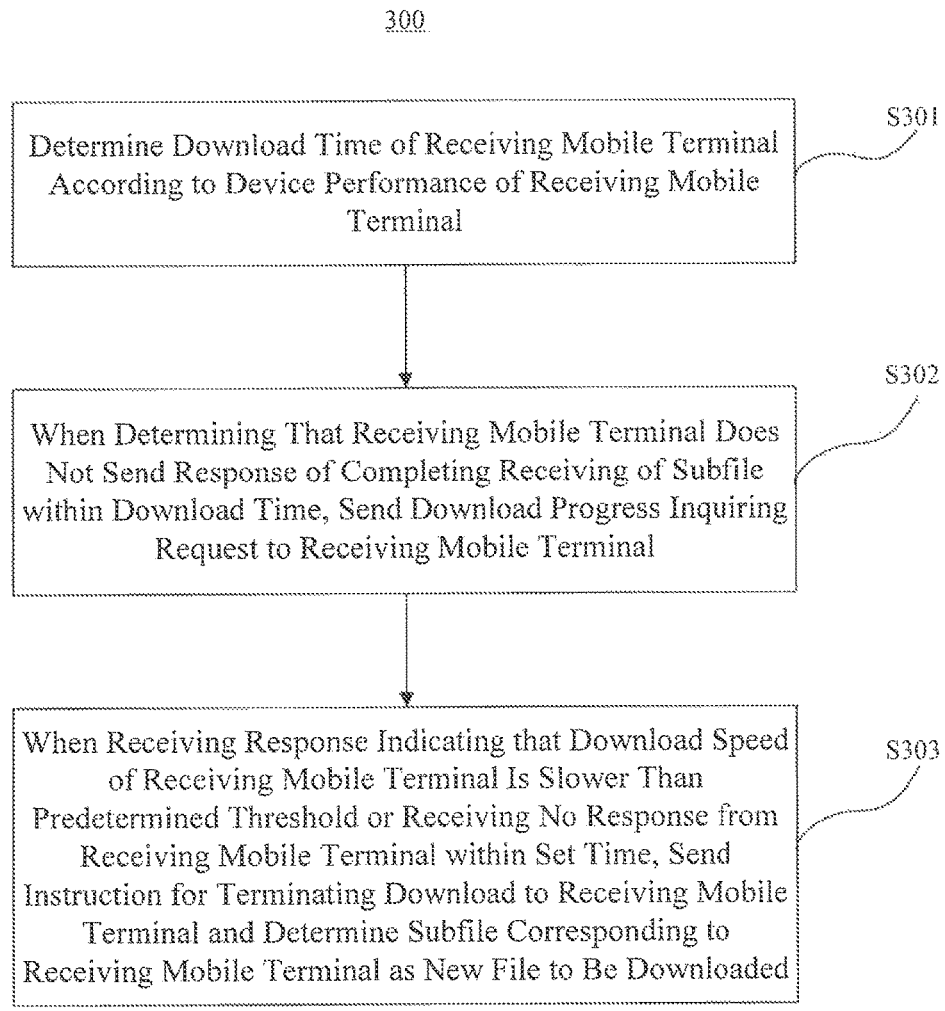
FIG. 3 is a flow chart of a method for checking a download progress, according to an exemplary embodiment.

FIG. 3 is a flowchart of a method 300 for the first mobile terminal to check a download progress of a receiving mobile terminal, according to an exemplary embodiment. Referring to FIG. 3, the method 300 includes the following steps.

In step S301, the first mobile terminal determines a download time of the receiving mobile terminal according to a device performance of the receiving mobile terminal.

In step S302, when determining that the receiving mobile terminal does not send a response of completing receiving of a subfile within the download time, the first mobile terminal sends a download progress inquiring request to the receiving mobile terminal.

In step S303, when receiving a response indicating that a download speed of the receiving mobile terminal is slower than the predetermined threshold, or receiving no response from the receiving mobile terminal within a set time after the download progress inquiring request is sent, the first mobile terminal sends the instruction for terminating download to the receiving mobile terminal, and a subfile in the server corresponding to the receiving mobile terminal is determined as a new file to be downloaded.

After the new file to be downloaded is determined in step S303, the first mobile terminal may start to download the new file. For example, a manner for downloading the new file, may be determined according to a size of the new file. If the new file is relative large, for example, a byte number of the new file is larger than a set minimum byte number of a file needing to be downloaded through a mobile terminal connected with the first mobile terminal, the first mobile terminal may determine that the new file is to be downloaded through a mobile terminal connected with the first mobile terminal needing file download, i.e., through a new receiving mobile terminal, using the above described methods. If the new file is relatively small, for example, the byte number of the file is smaller than the set minimum byte number of the file needing to be downloaded through a mobile terminal connected with the first mobile terminal, the first mobile terminal may download the new file directly from the server.

In exemplary embodiments, the first mobile terminal, after acquiring the subfiles received by all the receiving mobile terminals, may notify each receiving mobile terminal of other receiving mobile terminals that receive other subfiles and an arrangement sequence of each subfile in the file to be downloaded, so that each receiving mobile terminal may also acquire all the subfiles and combine the subfiles into one file.

For example, after the first mobile terminal acquires all the subfiles, the first mobile terminal sends a notification message carrying mobile terminal information corresponding to each subfile and an arrangement sequence of each subfile in the file to be downloaded to each receiving mobile terminal. When determining that the file needs to be received, a receiving mobile terminal may also acquire all the subfiles, combine the subfiles into one file, and save the file according to the notification message.

Figure 4:
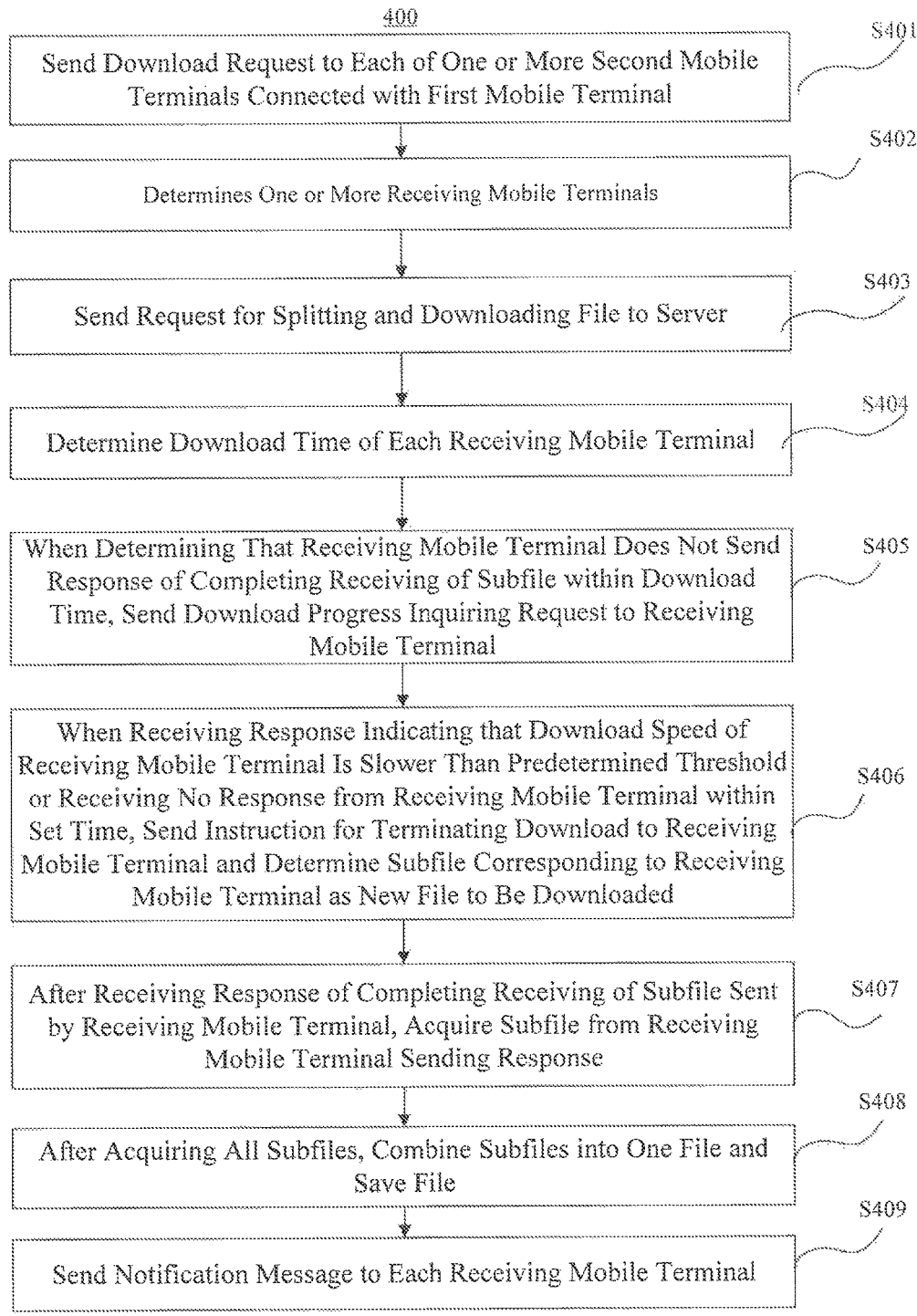
FIG. 4 is a flow chart of a method for downloading a file, according to an exemplary embodiment.

FIG. 4 is a flowchart of a method 400 for a first mobile terminal to download a file, according to an exemplary embodiment. Referring to FIG. 4, the method 400 includes the following steps.

In step S401, the first mobile terminal sends a download request to each of one or more second mobile terminals connected, wired or wirelessly, with the first mobile terminal.

In step S402, the first mobile terminal receives a response from each of the one or more second mobile terminals accepting the download request, and determines the second mobile terminal sending the response as a receiving mobile terminal, until a waiting time reaches a maximum waiting time set according to a size of the file to be downloaded, or a number of the determined receiving mobile terminals reaches a maximum number set according to the size of the file to be downloaded. As a result, the first mobile terminal determines one or more receiving mobile terminals.

In step S403, the first mobile terminal sends a request for splitting and downloading the file to a server, the request including a proportional relation of sizes of subfiles after splitting the file, which is determined according to the size of the file to be downloaded as well as a device performance and a bandwidth of each receiving mobile terminal, and a download mapping relation between the subfiles and the receiving mobile terminals, which is also determined according to the size of the file to be downloaded as well as the device performance and the bandwidth of each receiving mobile terminal for file reception. Accordingly, the server splits the file to be downloaded into the subfiles according to the proportional relation of the sizes of the subfiles, and sends each subfile to a corresponding receiving mobile terminal based on the download mapping relation, a number of the subfiles being the same as a number of the receiving mobile terminals.

In step S404, the first mobile terminal determines a download time of each receiving mobile terminal according to a device performance of the receiving mobile terminal.

In step S405, when determining that a receiving mobile terminal does not send a response of completing receiving of a subfile within the set download time, the first mobile terminal sends a download progress inquiring request to the receiving mobile terminal.

In step S406, when receiving a response indicating that a download speed of the receiving mobile terminal is slower than a predetermined threshold, or receiving no response from the receiving mobile terminal within a set time after the download progress inquiring request is sent, the first mobile terminal sends an instruction for terminating download to the receiving mobile terminal, and the subfile in the server corresponding to the receiving mobile terminal is determined as a new file to be downloaded.

In step S407, after receiving a response of completing receiving of a subfile sent by a receiving mobile terminal, the first mobile terminal acquires the subfile from the receiving mobile terminal sending the response.

In step S408, after acquiring all the subfiles, the first mobile terminal combines the subfiles into one file and saves the file.

In step S409, the first mobile terminal sends to each receiving mobile terminal a notification message carrying mobile terminal information corresponding to each subfile and an arrangement sequence of each subfile in the file to be downloaded. When determining that the file needs to be received, a receiving mobile terminal may also acquire all the subfiles, combine the subfiles into one file, and save the file according to the notification message.

By using the method 400, the first mobile terminal can complete downloading the file within a relatively short time, and an efficiency of the download progress can be improved.

Figure 5:
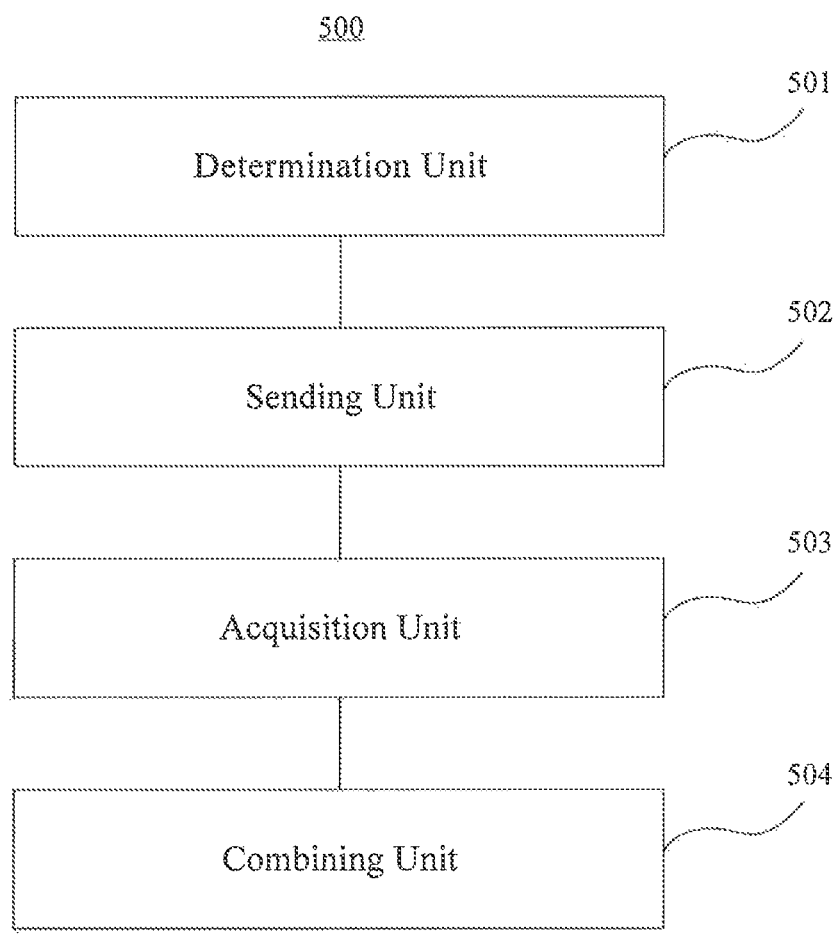
FIG. 5 is a block diagram of a device for downloading a file, according to an exemplary embodiment.

FIG. 5 is a block diagram of a device 500 for downloading a file, according to an exemplary embodiment. For example, the device 500 may be a first mobile terminal or a part of the first mobile terminal. Referring to FIG. 5, the device 500 includes a determination unit 501, a sending unit 502, an acquisition unit 503, and a combining unit 504.

The determination unit 501 is configured to determine at least one second mobile terminal connected with the first mobile terminal as a receiving mobile terminal. The sending unit 502 is configured to send a request to server for splitting and downloading a file, so that the server splits the file into a plurality of subfiles and sends at least one of the plurality of subfiles to the receiving mobile terminal. The acquisition unit 503 is configured to, after the receiving mobile terminal completes receiving of the subfile, acquire the subfile from the receiving mobile terminal. The combining unit 504 is configured to, after acquiring all the subfiles, combine the subfiles into one file and save the file.

Figure 6:
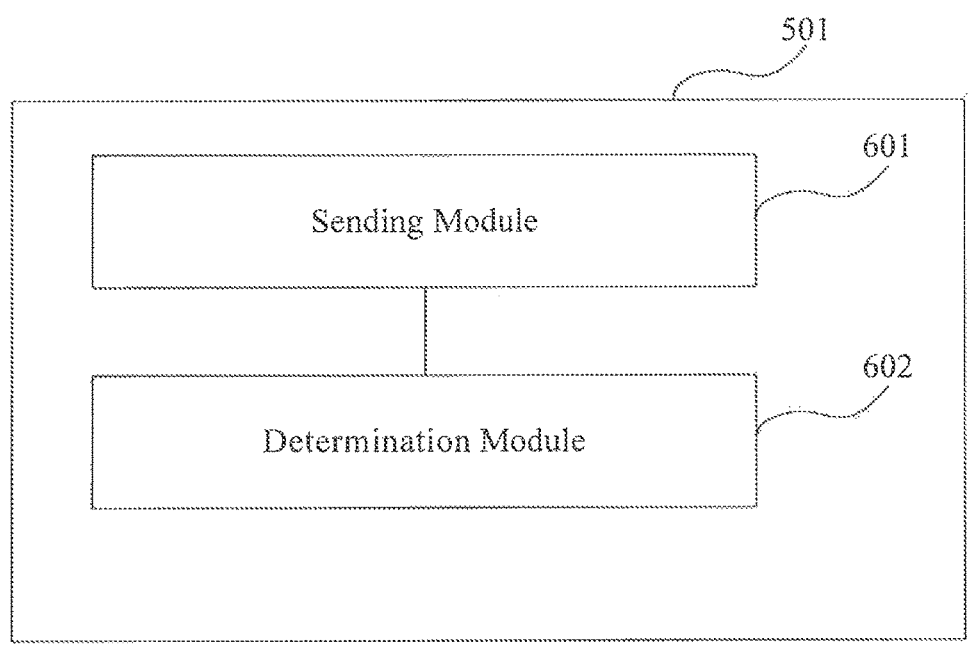
FIG. 6 is a block diagram of a determination unit, according to an exemplary embodiment.

FIG. 6 is a block diagram of the determination unit 501 (FIG. 5), according to an exemplary embodiment. Referring to FIG. 6, the determination unit 501 includes a sending module 601 and a determination module 602.

The sending module 601 is configured to, when determining that a the needs to be downloaded, send a download request to each of one or more second mobile terminal connected with the first mobile terminal.

The determination module 602 is configured to receive a response from at least one of the one or more second mobile terminals accepting the download request, and determine the second mobile terminal sending the response as a receiving mobile terminal, until a waiting time reaches a maximum waiting time set according to a size of the file to be downloaded, or a number of the determined receiving mobile terminals reaches a maximum number set according to the size of the file to be downloaded.

Figure 7:
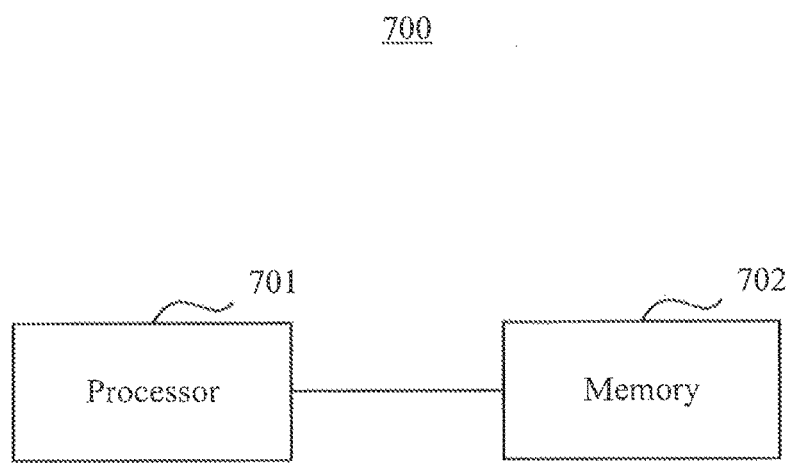
FIG. 7 is a block diagram of a mobile terminal, according to an exemplary embodiment.

FIG. 7 is a block diagram of a mobile terminal 700, according to an exemplary embodiment. For example, the mobile terminal 700 may be the first mobile terminal described above. Referring to FIG. 7, the mobile terminal 700 includes a processor 701 configured to execute instructions to perform the above described methods, and memory resources represented by a memory 702, for storing the instructions and otherwise facilitating operation of the processor 701.

In exemplary embodiments, there is also provided a non-transitory computer readable storage medium including instructions, such as included in the memory 702, executable by the processor 701 in the mobile terminal 700, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

Figure 8:
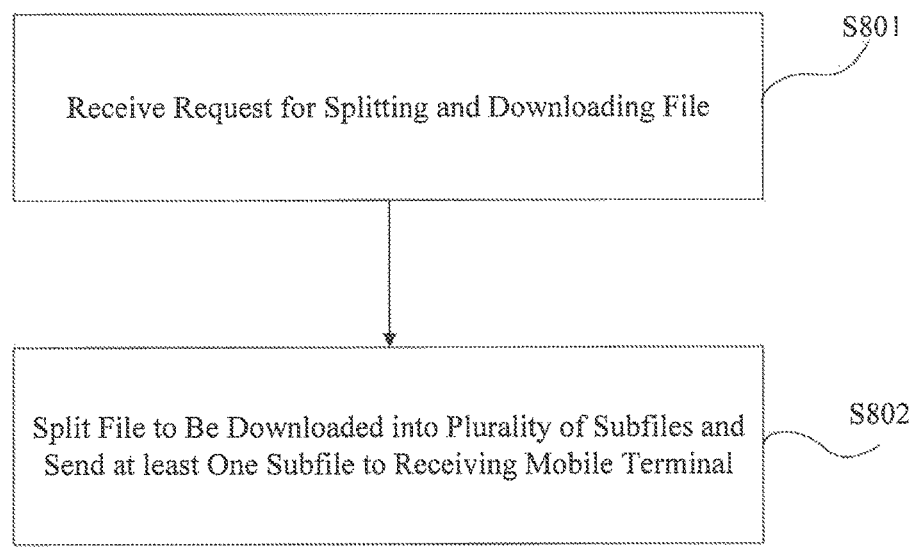
FIG. 8 is a flow chart of a method for providing a file to be downloaded, according to an exemplary embodiment.

FIG. 8 is a flowchart of a method 800 for a server to provide a file to be downloaded, according to an exemplary embodiment. Referring to FIG. 8, the method 800 includes the following steps.

In step S801, the server receives a request, sent by a first mobile terminal, for splitting and downloading a file, after the first mobile determines at least one receiving mobile terminal connected with the first mobile terminal.

In step S802, the server splits the file to be downloaded into a plurality of subfiles and sends at least one subfile to the receiving mobile terminal. The server may send remaining subfile(s) to the first mobile terminal directly. After the receiving mobile terminal completes receiving of the subfile, the first mobile terminal acquires the subfile received by the receiving mobile terminal, and combines the acquired subfile and any remaining subfile(s) directly received from the server into one file and saves the file.

Figure 9:
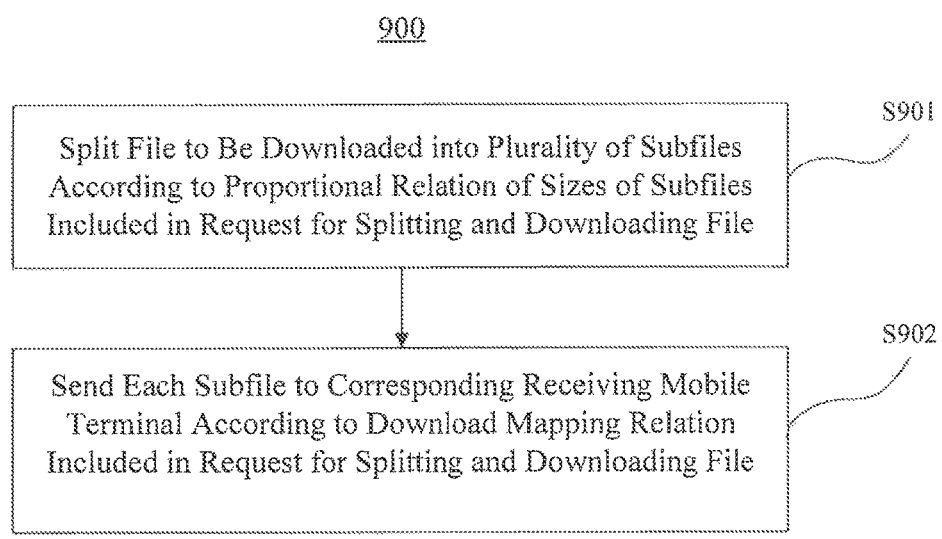
FIG. 9 is a flow chart of a method for sending a subfile to a mobile terminal, according to an exemplary embodiment.

FIG. 9 is a flowchart of a method 900 for the server to send subfiles of the file to be downloaded, according to an exemplary embodiment. Referring to FIG. 9, the method 900 includes the following steps.

In step S901, the server splits the file to be downloaded into the plurality of subfiles according to a proportional relation of sizes of subfiles included in the request for splitting and downloading the file that is received from the first mobile terminal, a number of the subfiles being the same as a number of the receiving mobile terminals.

In step S902, the server sends each subfile to a corresponding receiving mobile terminal according to a download mapping relation included in the request for splitting and downloading the file.

Figure 10:
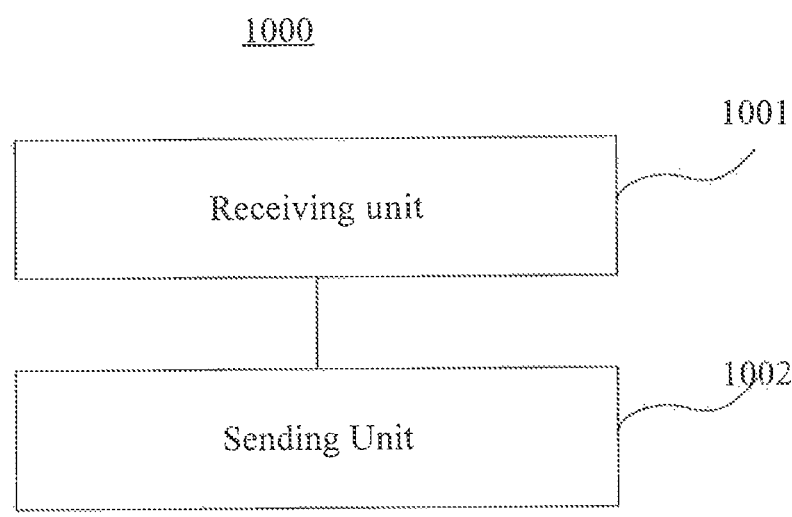
FIG. 10 is a block diagram of a device for providing a file to be downloaded, according to an exemplary embodiment.

FIG. 10 is a block diagram of a device 1000, according to an exemplary embodiment. For example, the device 1000 may be a server or a part of the server. Referring to FIG. 10, the device 1000 includes a receiving unit 1001 and a sending unit 1002.

The receiving unit 1001 is configured to receive a request, sent by a first mobile terminal, for splitting and downloading a file to be downloaded, after the first mobile terminal determines at least one receiving mobile terminal connected with the first mobile terminal.

The sending unit 1002 is configured to split the file into a plurality of subfiles and send at least one of the subfiles to the receiving mobile terminal. After the receiving mobile terminal completes receiving the subfile, the first mobile terminal acquires the subfile from the receiving mobile terminal and after acquiring all the subfiles, combines the subfiles into one file and saves the file.

In exemplary embodiments, the sending unit 1002 is further configured to send each of the plurality of subfiles to a corresponding receiving mobile terminal according to a download mapping relation included in the request for splitting and downloading the file.

Figure 11:
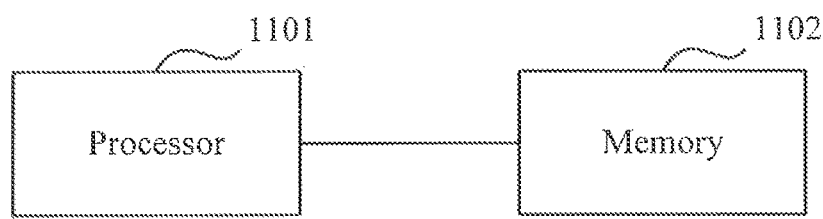
FIG. 11 is a block diagram of a server, according to an exemplary embodiment.

FIG. 11 is a block diagram of a server 1100, according to an exemplary embodiment. Referring to FIG. 11, the server 1100 includes a processor 1101 configured to execute instructions to perform the above described methods, and memory resources represented by a memory 1102, for storing the instructions and otherwise facilitating operation of the processor 1101.

In exemplary embodiments, there is also provided a non-transitory computer readable storage medium including instructions, such as included in the memory 1102, executable by the processor 1101 in the server 1100, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

Figure 12:
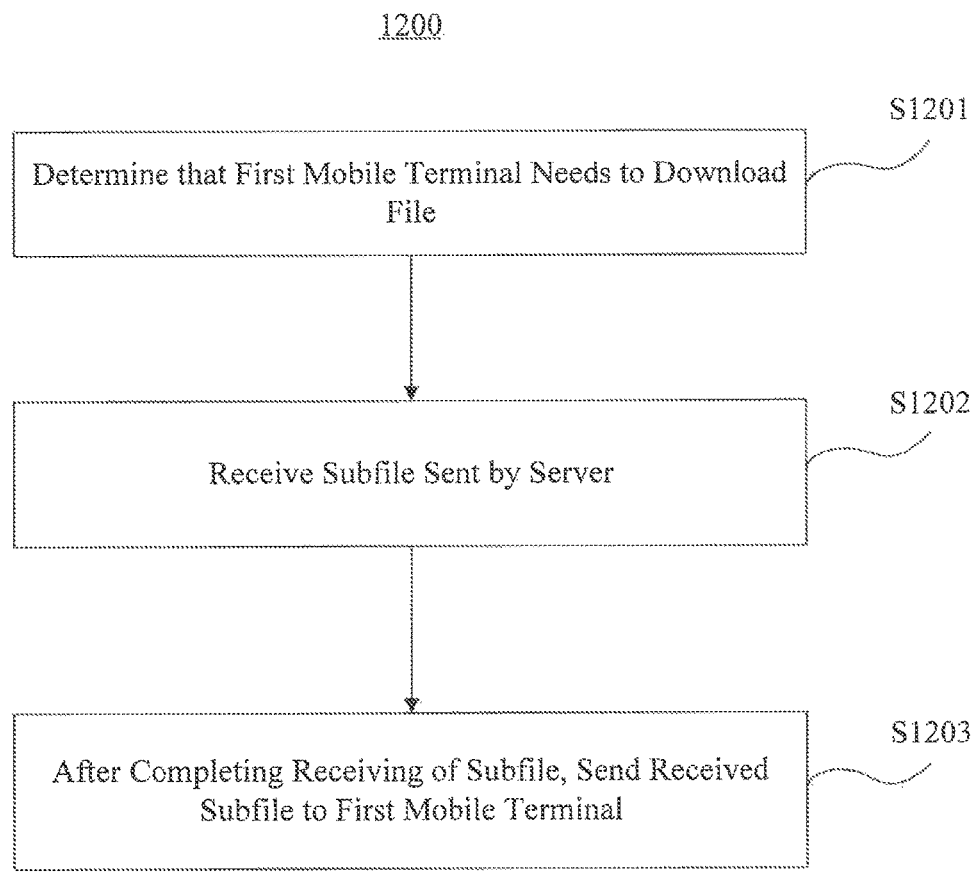
FIG. 12 is a flow chart of a method for downloading a file, according to an exemplary embodiment.

FIG. 12 is a flowchart of a method 1200 for downloading a file for use in a receiving mobile terminal, according to an exemplary embodiment. For example, the receiving mobile terminal is connected with a first mobile terminal downloading a file from a server, and the first mobile terminal downloads the file through the receiving mobile terminal. Referring to FIG. 12, the method 1200 includes the following steps.

In step S1201, the receiving mobile terminal determines that the first mobile terminal needs to download a file.

In step S1202, the receiving mobile terminal receives a subfile sent by the server, after the server splits the file to be downloaded into a plurality of subfiles.

In step S1203, after completing receiving the sub-file, the receiving mobile terminal sends the received subfile to the first mobile terminal, such that the first mobile terminal, after acquiring all of the subfiles, combines the subfiles into one file and saves the file.

Figure 13:
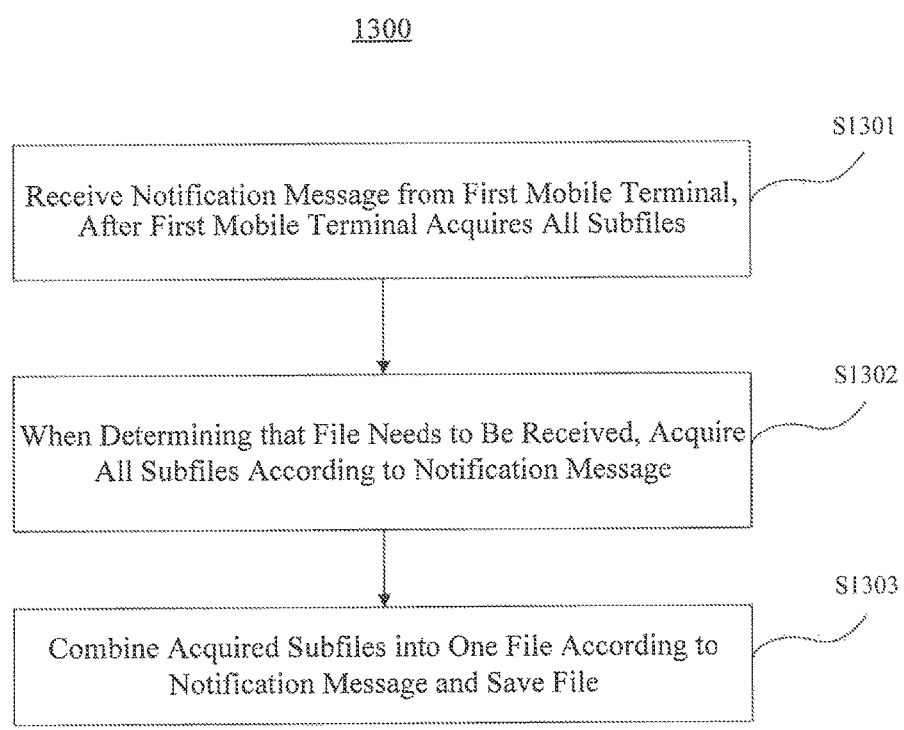
FIG. 13 is a flow chart of a method for downloading a file, according to an exemplary embodiment.

FIG. 13 is a flowchart of a method 1300 for downloading a file for use in the receiving mobile terminal, according to an exemplary embodiment. Referring to FIG. 13, the method 1300 includes the following steps.

In step S1301, the receiving mobile terminal receives from the first mobile terminal a notification message carrying mobile terminal information corresponding to each subfile and an arrangement sequence of each subfile in the file, after the first mobile terminal acquires all the subfiles of the file.

In step S1302, when determining that the file needs to be received, the receiving mobile terminal acquires all the subfiles of the file according to the notification message.

In step S1303, the receiving mobile terminal combines the acquired subfiles into one file and saves the file according to the notification message.

Figure 14:
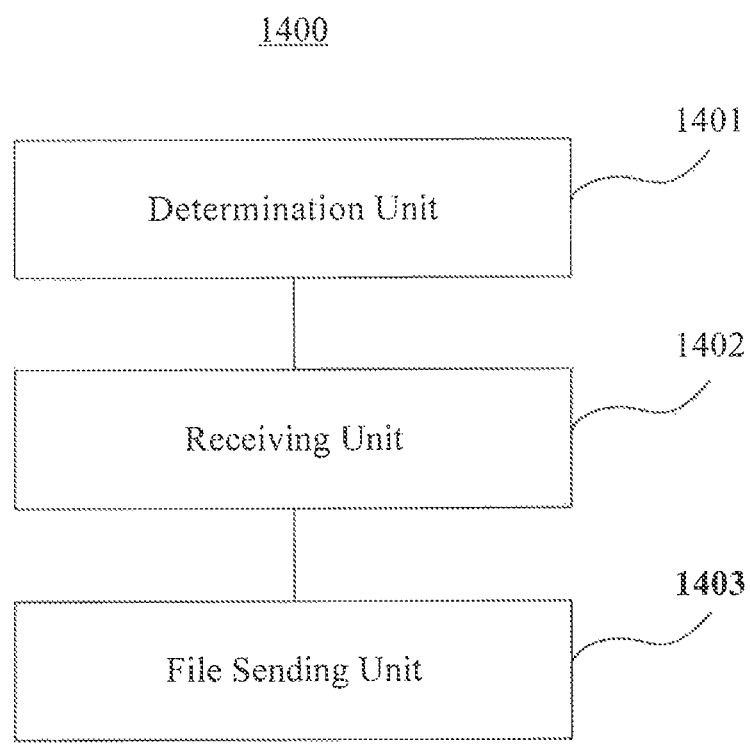
FIG. 14 is a block diagram of a device for downloading a file, according to an exemplary embodiment.

FIG. 14 is a block diagram of a device 1400, according to an exemplary embodiment. For example, the device 1400 may be a receiving mobile terminal or a part of the receiving mobile terminal. Referring to FIG. 14, the device 1400 includes a determination unit 1401, a receiving unit 1402, and a file sending unit 1403

The determination unit 1401 is configured to determine that a first mobile terminal connected with the receiving mobile terminal needs to download a file from a server.

The receiving unit 1402 is configured to receive a subfile sent by the server after the server splits the file to be downloaded into a plurality of subfiles.

The file sending unit 1403 is configured to, after completing receiving of the subfile, send the received subfile to the first mobile terminal, such that the first mobile terminal, after acquiring all of the sub-files, combines the subfiles into one file and saves the file.

Figure 15:
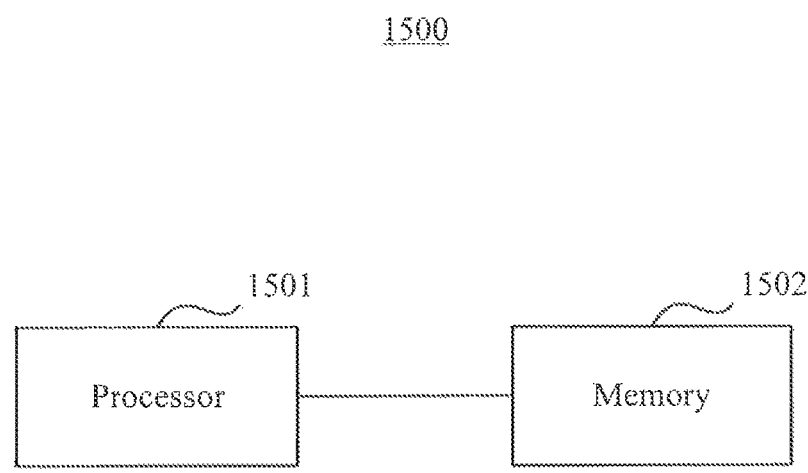
FIG. 15 is a block diagram of a mobile terminal, according to an exemplary embodiment.

FIG. 15 is a block diagram of a mobile terminal 1500, according to an exemplary embodiment. For example, the mobile terminal 1500 may be any of the above described receiving mobile terminals. Referring to FIG. 15, the mobile terminal 1500 includes a processor 1501 configured to execute instructions to perform the above described methods, and memory resources represented by a memory 1502, for storing the instructions and otherwise facilitating operation of the processor 1501.

In exemplary embodiments, there is also provided a non-transitory computer readable storage medium including instructions, such as included in the memory 1502, executable by the processor 1501 in the mobile terminal 1500, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

Figure 16:
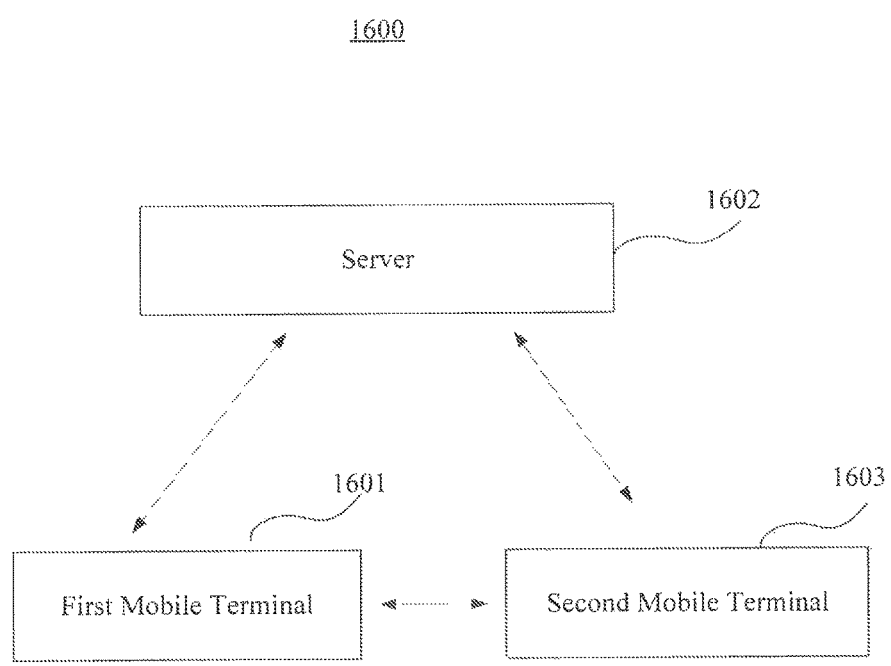
FIG. 16 is a block diagram of a system for downloading a file, according to an exemplary embodiment.

FIG. 16 is a block diagram of a system 1600 for downloading a file, according to an exemplary embodiment. Referring to FIG. 16, the system 1600 includes a first mobile terminal 1601 to download a file, a server 1602, and at least one second mobile terminal 1603.

The first mobile terminal 1601 is configured to: determine the at least one second mobile terminal 1603 connected with the first mobile terminal as a receiving mobile terminal; send a request for splitting and downloading the file for the server 1602 to split the file into a plurality of subfiles; after the second mobile terminal 1603 completes receiving a subfile, acquire the subfile from the second mobile terminal 1603; and after acquiring all of the subfiles, merge the subfiles into one file and save the file;

The server 1602 is configured to, after receiving the request for splitting and downloading the file, split the file into a plurality of subfiles and send at least one of the subfiles to the second mobile terminal 1603.

The second mobile terminal 1603 is configured to receive the subfile sent by the server 1602, and send the received subfile to the first mobile terminal 1601 after completing receiving of the subfile.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that, the present disclosure is not limited to the exact construction that has been described above and illustrated in the accompanying drawings, and that various modifications and changes may be made without departing from the scope thereof. It is intended that the scope of the disclosure should only be limited by the appended claims.

What is claimed is:

1. A method for downloading a file for use in a first mobile terminal, comprising:
    determining at least one second mobile terminal, connected with the first mobile terminal, as a receiving mobile terminal;
    sending a request for splitting and downloading a file for a server to split the file into a plurality of subfiles and send at least one of the plurality of subfiles to the receiving mobile terminal;
    after the receiving mobile terminal completes receiving of the subfile, acquiring the subfile from the receiving mobile terminal; and
    after all of the plurality of subfiles are acquired, combining the plurality of subfiles into the file and saving the file;
    wherein the first mobile terminal determines a plurality of receiving mobile terminals, and the method further comprises:
    including, in the request for splitting and downloading the file, a proportional relation of sizes of the subfiles and a download mapping relation between the subfiles and the receiving mobile terminals, the proportional relation and the download mapping relation each being determined according to a size of the file and a device performance and a bandwidth of each of the receiving mobile terminals, for the server to split the file into the plurality of subfiles according to the proportional relation, and send each subfile to a corresponding receiving mobile terminal according to the download mapping relation, a number of the plurality of subfiles being the same as a number of the receiving mobile terminals.

2. The method according to claim 1, wherein the determining of the at least one second mobile terminal comprises:
    sending a download request to each of one or more second mobile terminals connected with the first mobile terminal; and
    receiving a response from at least one of the one or more second mobile terminals accepting the download request, and determining the second mobile terminal sending the response as one receiving mobile terminal, until a waiting time reaches a maximum waiting time set according to a size of the file, or a number of the determined receiving mobile terminals reaches a maximum number set according to the size of the file.

3. The method according to claim 1, wherein after sending the request for splitting and downloading the file to the server, the method further comprises:
    when determining at least one of that a download speed of the receiving mobile terminal is slower than a predetermined threshold or that a connection between the receiving mobile terminal and the first mobile terminal is poor, sending an instruction for terminating download to the receiving mobile terminal, and determining the subfile corresponding to the receiving mobile terminal as a new file to be downloaded.

4. The method according to claim 3, further comprising:
    determining a download time of the receiving mobile terminal according to a device performance of the receiving mobile terminal;
    when determining that the receiving mobile terminal does not send a response of completing receiving of the subfile within the download time, sending a download progress inquiring request to the receiving mobile terminal; and
    when receiving a response indicating the download speed of the receiving mobile terminal is slower than the predetermined threshold or receiving no response from the receiving mobile terminal within a set time after the download progress inquiring request is sent, sending the instruction for terminating download to the receiving mobile terminal, and determining the subfile corresponding to the receiving mobile terminal as the new file to be downloaded.

5. The method according to claim 1, wherein the acquiring of the subfile received by the receiving mobile terminal comprises:
    after receiving a response of completing receiving of the subfile from the receiving mobile terminal, acquiring the subfile from the receiving mobile terminal.

6. The method according to claim 1, wherein after all of the plurality of subfiles are acquired, further comprising:
    sending a notification message carrying mobile terminal information corresponding to each subfile and an arrangement sequence of each subfile in the file to the receiving mobile terminal such that, when the receiving mobile terminal determines to download the file, the receiving mobile terminal acquires all of the plurality of subfiles, combines the subfiles into one file, and saves the file according to the notification message.

7. A method for a server to provide a file to be downloaded, comprising:
    receiving a request for splitting and downloading a file, sent by a first mobile terminal, after the first mobile terminal determines at least one second mobile terminal connected with the first mobile terminal as a receiving mobile terminal; and
    splitting the file into a plurality of subfiles and sending at least one of the plurality of subfiles to the receiving mobile terminal,
    wherein after the receiving mobile terminal completes receiving of the subfile, the first mobile terminal acquires the subfile from the receiving mobile terminal, and after all of the plurality of subfiles are acquired, the first mobile terminal combines the subfiles into the file and saves the file; and wherein the received request includes a proportional relation of sizes of the subfiles and a download mapping relation between the subfiles and a plurality of receiving mobile terminals determined by the first mobile terminal, the proportional relation and the download mapping relation each being determined according to a size of the file and a device performance and a bandwidth of each of the receiving mobile terminals, the method further comprising:

splitting the file into the plurality of subfiles according to the proportional relation, a number of the subfiles being the same as a number of the receiving mobile terminals; and sending each subfile to a corresponding receiving mobile terminal according to the download mapping relation.

8. A method for downloading a file for use in a second mobile terminal, comprising:

determining that a first mobile terminal connected with the second mobile terminal needs to download a file;

receiving a subfile sent by a server, after the server receives from the first mobile terminal a request for splitting and downloading the file and splits the file into a plurality of subfiles; and after completing the receiving of the subfile, sending the received subfile to the first mobile terminal, such that the first mobile terminal, after acquiring all of the plurality of subfiles, combines the plurality of subfiles into the file and saves the file;

wherein the second mobile terminal is one of a plurality of receiving mobile terminals determined by the first mobile terminal, and the request for splitting and downloading the file includes a proportional relation of sizes of the subfiles and a download mapping relation between the subfiles and the receiving mobile terminals, the proportional relation and the download mapping relation each being determined according to a size of the file and a device performance and a bandwidth of each of the receiving mobile terminals, for the server to split the file into the plurality of subfiles according to the proportional relation, and send each subfile to a corresponding receiving mobile terminal according to the download mapping relation, a number of the plurality of subfiles being the same as a number of the receiving mobile terminals.

9. The method according to claim 8, further comprising:

receiving, from the first mobile terminal, a notification message carrying mobile terminal information corresponding to each of the plurality of subfiles and an arrangement sequence of each of the plurality of subfiles in the file, after the first mobile terminal acquires all of the plurality of subfiles;

when determining that the file needs to be received, acquiring all of the plurality of subfiles according to the notification message; and combining the acquired subfiles into the file and saving the file according to the notification message.

10. A first mobile terminal for downloading a file, comprising:

a processor; and a memory for storing instructions executable by the processor;

wherein the processor is configured to:

determine at least one second mobile terminal, connected with the first mobile terminal, as a receiving mobile terminal;

send a request for splitting and downloading a file for a server to split the file into a plurality of subfiles and send at least one of the plurality of subfiles to the receiving mobile terminal;

after the receiving mobile terminal completes receiving of the subfile, acquire the subfile from the receiving mobile terminal; and after all of the plurality of subfiles are acquired, combine the plurality of subfiles into the file and save the file;

wherein the first mobile terminal determines a plurality of receiving mobile terminals, and the processor is further configured to:

include, in the request for splitting and downloading the file, a proportional relation of sizes of the subfiles and a download mapping relation between the subfiles and the receiving mobile terminals, the proportional relation and the download mapping relation each being determined according to a size of the file and a device performance and a bandwidth of each of the receiving mobile terminals, for the server to split the file into the plurality of subfiles according to the proportional relation, and send each subfile to a corresponding receiving mobile terminal according to the download mapping relation, a number of the subfiles being the same as a number of the receiving mobile terminals.

11. The first mobile terminal according to claim 10, wherein the processor is further configured to:

send a download request to each of one or more second mobile terminals connected with the first mobile terminal; and receive a response from at least one of the one or more second mobile terminals accepting the download request, and determine the second mobile terminal sending the response as one receiving mobile terminal, until a waiting time reaches a maximum waiting time set according to a size of the file, or a number of the determined receiving mobile terminals reaches a maximum number set according to the size of the file.

12. The first mobile terminal according to claim 10, wherein the processor is further configured to:

when determining at least one of that a download speed of the receiving mobile terminal is slower than a predetermined threshold or that a connection between the receiving mobile terminal and the first mobile terminal is poor, send an instruction for terminating download to the receiving mobile terminal, and determine the subfile corresponding to the receiving mobile terminal as a new file to be downloaded.

13. The first mobile terminal according to claim 12, wherein the processor is further configured to:

determine a download time of the receiving mobile terminal according to a device performance of the receiving mobile terminal;

when determining that the receiving mobile terminal does not send a response of completing receiving of the subfile within the download time, send a download progress inquiring request to the receiving mobile terminal; and when receiving a response indicating the download speed of the receiving mobile terminal is slower than the predetermined threshold or receiving no response from the receiving mobile terminal within a set time after the download progress inquiring request is sent, send the instruction for terminating download to the receiving mobile terminal, and determine the subfile corresponding to the receiving mobile terminal as the new file to be downloaded.

14. The first mobile terminal according to claim 10, wherein the processor is further configured to:
   after the first mobile terminal receives a response of completing receiving of the subfile from the receiving mobile terminal, acquire the subfile from the receiving mobile terminal.

15. The first mobile terminal according to claim 10, wherein the processor is further configured to:
   send a notification message carrying mobile terminal information corresponding to each subfile and an arrangement sequence of each subfile in the file to the receiving mobile terminal such that, when the receiving mobile terminal determines to receive the file, the receiving mobile terminal acquires all of the plurality of subfiles, combines the subfiles into one file, and saves the file according to the notification message.

16. A server for providing a file to be downloaded, comprising:
   a processor; and
   a memory for storing instructions executable by the processor;
   wherein the processor is configured to:
   receive a request for splitting and downloading a file, sent by a first mobile terminal, after the first mobile terminal determines at least one second mobile terminal connected with the first mobile terminal as a receiving mobile terminal; and
   split the file into a plurality of subfiles and send at least one of the plurality of subfiles to the receiving mobile terminal,
   wherein after the receiving mobile terminal completes receiving of the subfile, the first mobile terminal acquires the subfile from the receiving mobile terminal, and after all of the plurality of subfiles are acquired, the first mobile terminal combines the subfiles into the file and saves the file; and
   wherein the received request includes a proportional relation of sizes of the subfiles and a download mapping relation between the subfiles and a plurality of receiving mobile terminals determined by the first mobile terminal, the proportional relation and the download mapping relation each being determined according to a size of the file and a device performance and a bandwidth of each of the receiving mobile terminals, the processor being further configured to:
   split the file into the plurality of subfiles according to the proportional relation of the subfiles, a number of the subfiles being the same as a number of the receiving mobile terminals; and
   send each subfile to a corresponding receiving mobile terminal according to the download mapping relation.

17. A second mobile terminal, comprising:
   a processor; and
   a memory for storing instructions executable by the processor;
   wherein the processor is configured to:
   determine that a first mobile terminal connected with the second mobile terminal needs to download a file;
   receive a subfile sent by a server, after the server receives from the first mobile terminal a request for splitting and downloading the file and splits the file into a plurality of subfiles; and
   after completing the receiving of the subfile, send the received subfile to the first mobile terminal, such that the first mobile terminal, after acquiring all of the plurality of subfiles, combines the plurality of subfiles into the file and saves the file;
   wherein the second mobile terminal is one of a plurality of receiving mobile terminals determined by the first mobile terminal, and the request for splitting and downloading the file includes a proportional relation of sizes of the subfiles and a download mapping relation between the subfiles and the receiving mobile terminals, the proportional relation and the download mapping relation each being determined according to a size of the file and a device performance and a bandwidth of each of the receiving mobile terminals, for the server to split the file into the plurality of subfiles according to the proportional relation, and send each subfile to a corresponding receiving mobile terminal according to the download mapping relation, a number of the plurality of subfiles being the same as a number of the receiving mobile terminals.

18. The second mobile terminal according to claim 17, wherein the processor is further configured to:
   receive, from the first mobile terminal, a notification message carrying mobile terminal information corresponding to each of the plurality of subfiles and an arrangement sequence of each of the plurality of subfiles in the file, after the first mobile terminal acquires all of the plurality of subfiles;
   when determining that the file needs to be received, acquire all of the plurality of subfiles according to the notification message; and
   combine the acquired subfiles into the file and save the file according to the notification message.

* * * * *